106-18.23 SR

XR 3,944,717

United States Patent

Hacker et al.

[11] 3,944,717

[45] Mar. 16, 1976

[54] FLAME-RETARDANT, WATER-RESISTANT COMPOSITION AND COATING TRANSMISSION MEMBER THEREWITH

[75] Inventors: Joseph Michael Hacker, Fallston, Md.; Stanley Kaufman, Dunwoody, Md.; Raffaele Antonio Sabia, Atlanta; Earl Salvator Sauer, Atlanta, Ga.; Charles Edward Tidd, Jr., Baltimore, Md.; Raymond Walker, Decatur, Ga.

[73] Assignees: Western Electric Company, Inc., New York, N.Y.; Bell Telephone Laboratories, Inc., Murray Hill, N.J.

[22] Filed: Aug. 15, 1973

[21] Appl. No.: 388,695

[52] U.S. Cl. ........... 174/23 C; 106/15 FP; 106/270; 156/47; 174/121 A; 260/28.5 D; 260/45.7 PH; 260/33.8 UA; 260/899; 427/117; 427/434

[51] Int. Cl.[2] ........................................ H02G 15/00

[58] Field of Search.. 260/28.5 D, 33.8 UA, 45.7 R, 260/45.7 P, 45.7 PH, 837 PV, 899; 106/15 FP, 270; 117/136, 232, 102 K, 115; 174/23 R, 23 C, 121 A, 121 SR; 156/47, 55, 48, 56, 53; 161/175, 403; 427/117, 434

[56] References Cited

UNITED STATES PATENTS

| | | | |
|---|---|---|---|
| 2,456,216 | 12/1948 | Richter | 260/45.7 PH |
| 2,881,151 | 4/1959 | Young et al. | 260/45.7 PH |
| 3,006,787 | 10/1961 | Blewis et al. | 174/121 A |
| 3,194,775 | 7/1965 | Bartlett | 260/28.5 D |
| 3,194,846 | 7/1965 | Blaga | 106/15 FP |
| 3,485,788 | 12/1969 | Csaszar | 260/28.5 D |
| 3,607,487 | 9/1971 | Biskeborn et al. | 156/47 |
| 3,610,814 | 10/1971 | Peacock | 174/23 R |
| 3,781,242 | 12/1973 | Mathis et al. | 260/45.7 P |
| 3,784,500 | 1/1974 | Gibbons | 260/28.5 D |
| 3,845,166 | 10/1974 | Betts et al. | 260/28.5 D |

FOREIGN PATENTS OR APPLICATIONS

| | | | |
|---|---|---|---|
| 1,175,850 | 12/1969 | United Kingdom | 174/23 C |

OTHER PUBLICATIONS

Lyons, "The Chemistry and Use of Fire Retardants" (Rec'd 1–1972), p. 293.

*Primary Examiner*—William A. Powell
*Assistant Examiner*—J. J. Gallagher
*Attorney, Agent, or Firm*—E. W. Somers

[57] ABSTRACT

A telephone service cable which runs from a distribution cable to a subscriber's premises or to a pay station is another link in a buried communications system having a water-resisting capability. A spirally quaded core comprised of individually insulated conductors is advanced through a bath of a flame-retardant, water-resistant composition prior to enclosing the core with a jacket. The interstices in the core and between the core and an inner jacket are caused to be filled with the composition which comprises a liquid system and a solid system. The liquid system includes a chlorinated paraffin while the solid system includes a polyvinyl chloride resin and a chlorinated polyethylene. An epoxy stabilizer and a phosphite stabilizer may be added to prevent thermal degradation of the filling composition.

9 Claims, 2 Drawing Figures

3944717
OR IN 174/23C

FLAME-RETARDANT, WATER-RESISTANT COMPOSITION AND COATING TRANSMISSION MEMBER THEREWITH

BACKGROUND OF THE INVENTION

1. Field of the Invention

This invention relates to a flame retardant waterproofing composition and coating transmission member therewith, and, more particularly, to a composition which is flame-retardant for use near subscriber's premises and is sufficiently water-resistant to complete a buried loop waterproof system for communications cable.

2. Description of the Prior Art

It has been an objective in the telecommunications industry to provide underground transmission media for various reasons. One of these, of course, is the aesthetic appeal of the absence of overhead lines. Another is the prevention of discontinuity of service due to fallen trees, windstorms and the like.

Of course, the burial of transmission media poses several problems which must be overcome to make such a system feasible. One of these is the problem of ingress of moisture into the buried cable with accompanying loss in transmission characteristics. In order to overcome this, the cable must be designed to prevent or resist the ingress of moisture.

The trend today is to fill the interstices of the cores of cable and wire with a waterproofing compound. A waterproofing compound is available for filling the interstices of exchange cable, such as is disclosed in U.S. Pat. No. 3,607,487 issued on Dec. 2, 1968 in the names of M. C. Biskeborn, J. P. McCann and R. A. Sabia. The patented composition is comprised of a mixture of petroleum jelly and a crystalline olefin polymer.

The last link in a buried loop plant includes a so-called service wire or cable which extends from a distribution cable to a subscriber's premises or to a pay station. Of course, the hereinbefore-described service cable poses an additional problem. Since the service cable extends to subscriber's premises, it is required that this cable also be flame-retardant. This requires that any waterproofing compound must also be flame-retardant.

While the petrolatum compound commonly used to fill the interstices of cable is water-resistant, it does not appear to offer the flame-retardant characteristics which are required for installation adjacent to subscriber's premises.

SUMMARY OF THE INVENTION

This invention provides a waterproofing composition which is both water-resistant and flame-retardant. A composition embodying the principles of this invention includes a liquid chlorinated paraffin constituent for flame-retardancy and for advantageously imparting water-resistance to the compound, a polyvinyl chloride resin base, which provides viscosity and toughness for the composition, and a chlorinated polyethylene for providing tack so as to adhere to individually-insulated conductors. An epoxy and phosphite stabilizer for preventing thermal degradation may be added to the composition.

An elongated transmission member to be provided with a coating of a flame-retardant, water-resistant composition is advanced through a bath of composition which includes a polyvinyl chloride homopolymer, a chlorinated polyethylene and a chlorinated paraffin where these three constituents are present in an amount ranging from at least 85.5 parts by weight per 100 parts by weight of the composition.

BRIEF DESCRIPTION OF THE DRAWINGS

The various features of the invention will be more readily understood from the following detailed description when read in conjunction with the accompanying drawings wherein.

DETAILED DESCRIPTION

Figure 1:
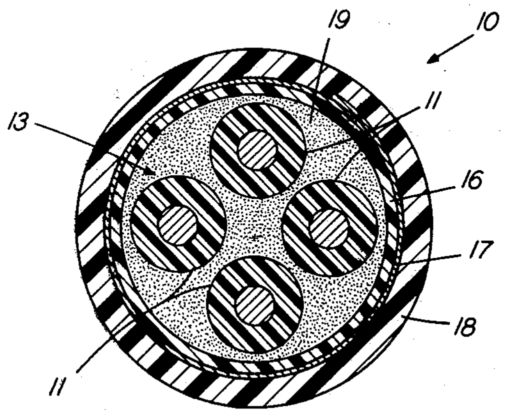
FIG. 1 is a sectional view of a service cable which includes a twisted quad of individually insulated conductors and a waterproofing composition embodying the principles of this invention filling the interstices of the core and between the core and an inner jacket.

Referring now to FIG. 1 there is shown a strand material in the form of a cable 10 which includes polyethylene-insulated conductors 11—11. Four conductors 11—11 are twisted together to form a quaded core, designated generally by the numeral 13. Commonly used conductors are copper and aluminum as well as alloys of either of these materials. Moreover, it is common practice to tin conductors to aid in making solder joints and no complications are introduced by this conventional procedure.

In the presently used environment, the individual polyethylene-insulated conductors 11—11 are enclosed by an inner jacket 16 which includes a polyvinyl chloride constituent, a metallic microorganism shield 17 and an outer jacket 18. Prior to the jacketing of the individual conductors 11—11, the service cable 10 has the interstices thereof filled with a waterproofing composition 19 which embodies the principles of the present invention.

By filling the interstices of the cable 10, protection is afforded against entry of water even if the cable were surrounded by water and the jacket 18 and shield 17 punctured by lightening or mechanical means. The shield 17 intercepts and absorbs the lightning but may have holes burned therein. Thus water can penetrate beyond the shield 17, but penetrates radially and longitudinally limited only by the water-resistant effectiveness of the composition 19 filling the interstices.

In order to be acceptable for filling purposes in a specified environment, the waterproofing composition 19 must possess certain properties. The waterproofing composition 19 must be flame-retardant, water-resistant and must be capable of being processed in a manufacturing facility.

A liquid constituent may be found which would have the required flame-retardant and water-retardant properties. However, a liquid lacks the body and the strength to act as a sole-constituent filling system.

On the other hand, a solid constituent or combination of several solid constituents may very well be found which would possess the requisite properties. However, a solid system in powder form, for example, could not be applied to the conductors 11—11 nor to the core of a stranded article to waterproof the conductors nor the stranded core.

Also, it is most desirable to fill the interstices of the cable 10 with a composition which can withstand flexing. The hereinbefore-described patented waterproofing compound is crystalline. This property may become manifested in microfissures or cracks when the filled cable 10 is subjected to flexure during wide temperature fluctuations.

A composition suitable for the described filling purposes must display toughness and yet must necessarily be a blend of solid and liquid constituents. After processing, the solid and liquid constituents must cooperate to solidify to the extent of forming a gelatinous substance.

While certain constituents may possess some of these properties, it is thought to be unknown that there is a combination of these constituents which will provide the desired properties of a waterproofing composition.

The composition which embodies the principles of this invention is a thermoplastic composition which comprises a liquid system and a solid system. The two systems complement each other to provide the requisite properties of the waterproofing composition while being capable of being processed in an economical and efficient manner.

The liquid system of the composition which embodies the principles of this invention includes a chlorinated paraffin. The chlorinated paraffin is added into the composition to provide the required flame-retardancy for the composition. If this constituent is not in liquid form, the mixing cycle of the composition is lengthened with an accompanying increase in the cost of processing.

The chlorinated paraffin provides the claimed composition with another important property. The chlorinated paraffin provides the composition with a water-retardancy characteristic. The chlorinated paraffin is a hydrocarbon material which is immiscible with water. Since the chlorinated paraffin is impervious to water, the filling of the interstices of the cable impedes the ingress of water.

The chlorinated paraffin constituent which is selected must posses certain specified properties for the purposes of the inventive composition. The chlorinated paraffin should have a molecular weight which falls within a range of 300 to 800 and should have a chlorine content which is in the range of 35 to 70 percent.

It is convenient to discuss concentrations in terms of 100 parts by weight of the composition. Concentrations so designated, therefore, result in compositions having 100 parts with each part designated as a percent by weight of the 100 parts.

A preferred concentration of the chlorinated paraffin is approximately 81.0 to 94.0 percent by weight per 100 percent by weight of the composition. If less than 81.0 percent by weight is used, additional solid materials must be used. This would increase the viscosity of the composition. The solid content of the composition is designed in order to achieve adequate viscosity for processing, to provide the ability to fill the interstices of the cable, and to provide for tack of the composition on the strand material. An increase in viscosity would increase processing costs. In the alternative, if less than 81 parts by weight of the chlorinated paraffin are used, the percent by weight of the stabilizers could be increased. But stabilizers are relatively expensive and this would inordinately increase the cost of the composition. If more than 94.0 percent by weight is used, then the solid content is insufficient to develop the gelling properties which are characteristic of a desirable waterproofing composition.

An acceptable liquid chlorinated paraffin is marketed by Imperial Chemical Industries, Ltd. under the trade name Cereclor and designated S-52. The Cereclor S-52 has a chlorine content of approximately 52 percent.

Of course, since the chlorinated paraffin provides the composition with both flame-retardance and water-retardancy, the question could be raised as to why the waterproofing composition 19 would not solely be comprised of the chlorinated paraffin. This is not feasible since the chlorinated paraffin which is used is in liquid form and hence lacks the consistancy and strength to act as a sole-constituent filling system. Solid constituents which are capable of being dissolved in the chlorinated paraffin at an elevated temperature must be added to the composition.

One of the solid system constituents of the composition 19 is a polyvinyl chloride homopolymer resin (hereinafter referred to as PVC). The PVC resin has all of the characteristics associated with a homopolymer which includes some abrasion resistance, but which in and of itself is heat unstable. However, when the PVC resin is caused to soften in order to process the waterproofing composition, the resistance to abrasion is reduced. Further, the PVC must be a suitable electrical grade PVC homopolymer. Also, the term "polymeric material" is defined as the PVC constituent.

The PVC homopolymer may be any of a number of general purpose or dispersion resins well known in the art for use as electrical insulation. In accordance with the A.S.T.M. standard for 1966, suitable compounds may be classified as within the range from GP $\overline{4}$-00003 to GP $\underline{6}$-00003 inclusive or D-2-00003 to D-$\underline{5}$-00003. Definitions of these characteristics are set forth in the A.S.T.M. standard under designation D 1755-66.

Briefly, the designation, GP, designates a general purpose resin whereas the designation, D, denotes a dispersion resin. The first numerals (e.g. entries $\overline{4}$ through $\underline{6}$) represent a polymer molecular weight in terms of solution viscosity, and the last digit, 3, indicates the usual preference for an electrical conductivity less than 6 ohms per centimeter per gram. The bar under or the bar over a numeral indicates a value less than or more than, respectively, the numeral. The four ciphers in the designations indicate that the properties of particle size, apparent bulk density, plasticizer absorption and dry flow may be any A.S.T.M. level, i.e., 1–9, and, therefore, these properties are not critical for the inventive purposes.

The primary solid constituent is the PVC. In the service cable 10, the inner jacket 16 is generally formed of a PVC material. As a result, there is a tendency toward fusion of the inner jacket 16 to the waterproofing composition 19 which is contiguous thereto (see FIG. 1). This obstructs the path of any water which might achieve ingress into the cable 10 beyond the shield 17.

The PVC resin must be selected depending on the end use and the requirements for processability. For example, the larger the particle size, the greater the time required for the PVC to dissolve in the presence of the other constituents. Therefore, if time is a factor in the manufacturing process, a PVC dispersion resin should be selected because of its smaller particle size. The PVC imparts viscosity and toughness to the composition.

A PVC resin having a substantial chlorine content should be used. The flame-retardancy of the PVC resin is proportional to the chlorine content thereof. It should be noted, however, that all the PVC resins would have approximately the same chlorine content. The theoretical chlorine content in PVC resin generally used would be on the order or magnitude of 56 percent.

The PVC resin is inherently flame-resistant because of the chlorine content thereof which is 56 percent by weight. However, when the PVC resin is compounded with general purpose plasticizers, the flame -retardancy of the PVC is diminished. In order to restore the level of the self-extinguishing characteristic of the PVC, an additive is required. One such additive is the chlorinated paraffin.

A preferred concentration of the PVC resin is 4.0 to 10.0 percent by weight of the composition. If less than 4.0 percent is used, the composition is not sufficiently viscious to coat the strand material. The composition would tend to drip off the sections of the strand material as the strand material is advanced through a bath of the water-proofing composition. Moreover, the resistance to flow at elevated temperatures would be unsatisfactory. On the other hand, if greater than 10.0 percent by weight of the PVC resin is used, the composition is too viscous for processing and for the application to the individual conductors 11—11 on the core of the service cable 10.

The PVC surprisingly is an extremely advantageous solid constituent for the purposes of the composition. Although the chlorinated paraffin may provide water-resistant properties in and of itself, some combinations thereof with solid constituents other than PVC yielded unacceptable water-resistant properties.

Moreover, it is unexpected to use PVC in an environment such as that of the waterproofing composition 19. Generally, PVC is thought to be used in the environment of molded and extruded applications, not as a gelatiious material for filling or coating.

Further, it is not believed to be generally known that PVC is a water-blocking constituent. Because of the process used to manufacture PVC homopolymers, a bulk polymerization process using water suspension, a small amount, i.e. a fraction of one percent, of the water which is used in that process is not removed from the PVC final product. Theoretically, the PVC could absorb a small amount of additional moisture and it is hypothesized that this negates its use as a water-blocking agent.

Also, it was not known that the PVC would be soluble in the total composition. Advantageously, the PVC dissolves in the liquid system comprising the chlorinated paraffin at a mixing temperature of approximately 300° F.

Another solid constituent which is combined with the PVC resin and the chlorinated paraffin is a chlorinated polyethylene. The chlorinated polyethylene provides tack so that the composition adheres to the individually polyethylene -insulated conductors 11—11 which comprise the core. The capability of the composition to cling to the conductors 11—11 is especially important in at least one of the processes which is used to fill the cable 10.

Since the conductors 11—11 are individually insulated with polyethylene, sufficiently high processing temperatures could cause the composition, through the vehicle of the chlorinated polyethylene ingredient, to fuse to the conductor insulation. Although the temperatures used are not sufficient to promote fusion, tack of the composition to the conductors 11—11 exists. This is true regardless of the insulation material which is used to insulate the conductors 11—11.

A preferred concentration of the chlorinated polyethylene added to the polyvinyl chloride resin is 0.5 to 1.5 percent by weight per 100 percent by weight of the composition. If less than 0.5 percent is used, some of the tack of the composition is lost. If more than 1.5 percent of the weight of the composition is chlorinated polyethylene, there is excessive tack. The waterproofing composition 19 would tend to cling excessively to the conductors 11—11. This may result in an installer not being able to remove the waterproofing composition from the insulation in order to strip the conductor 11.

The chlorinated polyethylene may be a chlorinated polyethylene such as CPE 4814 as marketed by The Dow Chemical Company. Moreover, the chlorinated polyethylene should be selected so as to have a chlorine content in range of from 25 to 50 percent by weight of that constituent. The CPE 4814 advantageously has a chlorine content of 48 percent. Because of the magnitude of its chlorine content, the chlorinated polyethylene also adds to the flame-retardancy of the composition.

The composition embodying the principles of this invention may comprise the polyvinyl chloride homopolymer, the chlorinated polyethylene constituent and the chlorinated paraffin in total 100 parts by weight of the composition. The PVC and the chlorinated polyethylene are in solid form added to the chlorinated paraffin which is in liquid form to provide a compound suitable for filling. The combined weight of these three constituents may be less than 100 but should be at least 85.5 parts by weight of the total composition. Where the combined weights of these constituents is less than 100 parts by weight, the remainder of the composition is structured to include stabilizers which are useful during processing.

Combined with the polyvinyl chloride resin, the chlorinated paraffin, and the chlorinated polyethylene is an epoxy stabilizer. The epoxy stabilizer adds heat stability to the composition 19 in order to prevent thermal degradation during the mixing of the composition and the application of the composition to the strand material 10. This is especially important since the PVC resin and the chlorinated paraffin are lacking in heat stability.

A preferred concentration of the liquid epoxy type stabilizer is 1.0 to 4.0 percent by weight per 100 percent by weight of the total composition. If less than 1 percent is used, there is a reduction in the heat stability of the composition. Also, discoloration occurs because of the rapid evolution of the hydrochloric acid from the composition. If more than 4 percent by weight is used, the constituent percentage becomes uneconomical. This is so because the efficiency level of the stability tends to level off and the stabilizer is costly in comparison to the other constituents.

An acceptable epoxy stabilizer is marketed by the Argus Chemical Company under the designation, Mark 224. A liquid epoxy type stabilizer is used because of its superior effectiveness in stabilizing the PVC resin and the chlorinated paraffin. One species of the liquid epoxy type stabilizer meeting the above criteria is an modified epoxidized soybean oil.

Combined with the polyvinyl chloride resin, the chlorinated paraffin, the chlorinated polyethylene and the epoxy stabilizer is a phosphite stabilizer which is added to the composition to provide additional heat stability and to prevent thermal degradation during the processing thereof.

A preferred concentration of the phosphite stabilizer is 0.5 to 3.5 percent by weight per 100 percent by weight of the composition. If less than 0.5 percent by weight is used, the heat stability of the composition is reduced. If an amount in excess of 3.5 percent by weight is used, the additional amount in excess of the 3.5 percent becomes uneconomical because of the relatively high cost of this constituent.

An acceptable phosphite stabilizer is one marketed by the Argus Chemical Company under the designation, Mark 517. The Mark 517 is a species of an alkyl aryl phosphite chelator. The chelator defines a function which is to prevent degradation during mixing and hence retard discoloration. If this material is not present, the waterproofing composition may turn opaque although the water retarding characteristics may remain the same.

It has been found that the temperature during the mixing of the constituents should not exceed 350° F. This will avoid degradation of the composition and a resulting decrease in the aesthetic quality thereof.

EXAMPLES AND TESTING

The hereinbefore-described composition has been found to satisfy the requirements of a waterproofing composition for filled service cable. Specifically, the composition is flame-retardant, has exceptional heat stability, and imparts excellent water-resistant properties to the cable.

The following examples illustrate various flame -retardant water-resistant compositions prepared in accordance with the principles of this invention and which provide the filled service cable 10 with the desired characteristics. In all cases, the cable structure is that of a multiple conductor service cable having polyethylene-insulated conductors. The examples are set forth in tabular form. For comparison purposes, all examples set forth were carried out using the general purpose PVC homopolymer described hereinbefore. Moreover, all amounts are in parts by weights.

The composition designated Example D in Table I has proven to be the preferred embodiment for filling the cable 10.

Table I

| Ranges % By Weight of Composition | Constituent | Example A | B | C | D |
|---|---|---|---|---|---|
| 4.0–10.0 | PVC Resin | 6.0 | 4.0 | 10.0 | 8.0 |
| 0.5–1.5 | Chlorinated Polyethylene | 1.0 | 0.5 | 1.5 | 1.0 |
| 1.0–4.0 | Epoxy Stabilizer | 3.0 | 1.0 | 4.0 | 4.0 |
| 0.5–3.5 | Phosphite Stabilizer | 3.0 | 0.5 | 3.5 | 2.0 |
| 81.0–94.0 | Chlorinated Paraffin | 87.0 | 94.0 | 81.0 | 85.0 |

TESTING

The flame-retardant, waterproofing composition must possess specified properties, some of which have been described hereinbefore. The following table illustrates some additional properties of the example compositions designated in Table I.

Test Results

| Properties | Example A | B | C | D |
|---|---|---|---|---|
| SP.GRAVITY | 1.260 | 1.236 | 1.234 | 1.250 |
| Viscosity (CPS) | | | | |
| 250°F | 613 | 186 | 196 | 840 |
| 266 | 420 | 140 | 149 | 575 |
| 275 | 254 | 108 | 129 | 480 |
| 300 | 171 | 74 | 88 | 313 |
| 325 | 119 | 54 | 63 | 213 |
| Flash Point | 350°F | 380°F | 370°F | 350°F |
| Flow at 65°C | NONE | NONE | NONE | NONE |
| Melting Point °F | 248 | 244 | 242 | 260°F Approx. |
| Adhesion to Metal | PASSES | PASSES | PASSES | PASSES |
| Vol.Resist (100V DC) | $5.61 \times 10^9$ | $2.44 \times 10^{10}$ | $2.87 \times 10^{10}$ | $5.42 \times 10^9$ |
| Dielectric Constant | | | | |
| $10^5$ Hertz | 7.92 | 7.81 | 7.65 | 7.76 |
| $10^6$ Hertz | 7.54 | 7.48 | 7.36 | 7.34 |
| Dissipation Factor | | | | |
| $10^5$ Hertz | 0.0299 | 0.0218 | 0.0236 | 0.0325 |
| $10^6$ Hertz | 0.0941 | 0.1180 | 0.0890 | 0.1380 |

The desired viscosity is such that at atmospheric pressure the waterproofing composition 19 will flow into the interstices of a cable core at a temperature range of 220° of 280°F. If the waterproofing composition 19 is too viscous, all the air bubbles in the core are not expelled, thereby causing occlusions within the core.

The consistency of the composition prevents it from oozing or being displaced and flowing during handling. It has a putty-like consistency which is not sticky or greasy. Installers can form splices by peeling away the jacket and stripping the conductor insulation. It is sufficiently putty-like so that it can be removed from the conductors 11—11 without special instruments.

The flash point is a measure of the relative flamability and a flash point equal to or greater than 350°F is desired.

The flow at 65°C is important to insure that the waterproofing composition 19 does not flow at a temperature which may be reached generally in the subscriber's premises.

The characteristic of adhesion to metal is important to indicate whether or not the waterproofing composition 19 is suitable for use in a cable environment. The adhesion to metal property is important to prevent separation of the filling material 16 from metallic surfaces which it engages as a result of temperature fluctuation. A composition embodying the principles of this invention is cast in a dish constructed of aluminum. The dish and composition are chilled down to a temperature of approximately −55°F. Then the temperature is raised to room temperature and the composition is examined. If the composition has not contracted so as to be spaced from the walls of the dish, the composition is said to "pass".

The dielectric constant is important in avoiding loss of signal in longer run cables. This is not especially important to the short run filled service cable.

USING THE COMPOSITION

In using the composition 19 which embodies the principles of this invention, the conductors 11—11 are advanced into a filling tank, designated generally by the numeral 21 (see FIG. 2) which holds a bath of the filling composition 19.

The temperature of the bath of the composition 19 in the tank 21 coupled with the time during which the conductors 11—11 are exposed to the bath is important. That combination must be such that the temperature of the conductor insulation remains less than its softening point. If the softening point is reached, the conductor insulation will be swelled and abraded off the conductors 11—11 as the conductors are advanced about a roller arrangement within the tank 21. Also, the temperature of the bath must not be so high as to degrade the composition 19. It has been found that a suitable bath temperature is 220° to 300°F at atmospheric pressure. Also, it has been found that a bath temperature of approximately 280°F and a line speed of approximately 400 feet per minute satisfies this requirement for the polyethylene-insulated conductors 11—11.

Figure 2:
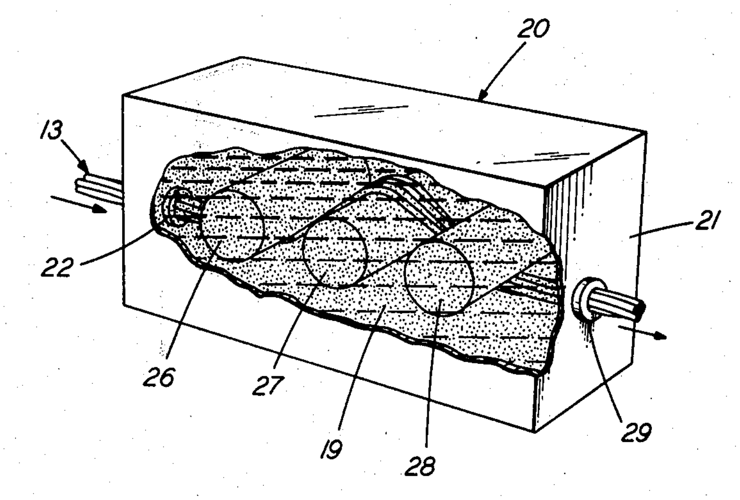
FIG. 2 is a perspective view of an apparatus which may be used to apply the waterproofing composition to the service cable.

The conductors 11—11 are advanced over rollers 26, 27 and 28 as seen in FIG. 2. The rollers 26 and 28 are spaced apart horizontally. The roller 27 is positioned such that an angle which the conductors 11—11 make with the horizontal as the conductors are moved from roller 26 to the roller 27 is within a specified range of 20° to 70°. This and other aspects of the filling process are disclosed in copending application Ser. No. 388,694 filed of even date herewith in the name of J. M. Hacker, now U.S. Pat. 3,885,380.

As the twisted cable 10 is passed about the roller 26, and then up and about the roller 27, the generally circular configuration of the core comprised of the conductors 11—11 tends to become elliptical or flattened thereby allowing each of the conductors to receive a coating of the composition 19. Then as the flattened array of the conductors 11—11 is passed under the roller 28, the conductors are reformed into their original configuration of the cable core. Subsequently, the core is advanced through a wiping die 29 in the wall of the tank 11 to remove the excess composition.

The reformation of the conductors 11—11 into the original quaded configuration causes the interstices between the conductors in the reformed cable core to be filled with the flame-retardant, water-resistant composition 19. As the cable core is advanced through the wiping die 29, the wiping die gathers together the hitherto slightly separated core comprising the composition-covered, insulated conductors 11—11. Excessive amounts of the composition 19 clinging to the conductors 11—11 is removed from the conductors in the reformed core and results in a generally regularly shaped coating of the composition about the core (see FIG. 1).

Test results have shown that the filling of the interstices of the service cable 10 is extremely complete. Samples of the filled cable 10 indicated that the core of the spiralled quad of the four conductors 11—11 is filled so as to produce a continuous filament, the cross sectional configuration of which is that of the core.

It should be understood that the composition 19 embodying the principles of this invention may be used to provide a waterproofing composition for cables having more or less than the number of conductors used in this description. Cables which are formed by twisting a plurality of conductors about a longitudinal axis or by stranding together previously twisted pairs may be filled with a composition embodying the principles of this invention.

It should be understood that while the composition which embodies the principles of this invention have been used to coat the insulated conductors 11—11 of the service cable 10, other transmission members may be coated therewith. Such transmission members may include multiconductor stranded cables as well as systems currently under development such as fiber optic transmission members.

It is to be understood that the above described arrangements are simply illustrative of the invention. Other arrangements may be devised by those skilled in the art which will embody the principles of the invention and fall within the spirit and scope thereof.

What is claimed is:

1. An elongated transmission member comprising a plurality of individually insulated conductors having a jacket formed thereover, the interstices formed between the conductors being filled substantially with a flame-retardant, water-resistant composition which comprises a polyvinyl chloride homopolymer, a chlorinated polyethylene, and a chlorinated paraffin where the polyvinyl chloride homopolymer, the chlorinated polyethylene and the chlorinated paraffin are present in an amount range from at least 85.5 parts by weight per 100 parts by weight of the composition.

2. The elongated transmission member of claim 1, wherein the polyvinyl chloride homopolymer ranges from 4.0 to 10.0 parts by weight per 100 parts by weight of the composition.

3. The elongated transmission member of claim 1, wherein the chlorinated polyethylene ranges from 0.5 to 1.5 parts by weight of the composition.

4. The elongated transmission member of claim 1, wherein the chlorinated paraffin ranges from 81.0 to 94.0 parts by weight per 100 parts by weight of the composition.

5. The elongated transmission member of claim 1, wherein the composition further comprises an epoxy stabilizer and wherein the epoxy stabilizer ranges from 1.0 to 4.0 parts by weight per 100 parts by weight of the composition.

6. The elongated transmission member of claim 5, wherein the composition further comprises a phosphite stabilizer, and wherein the phosphite stabilizer ranges from 0.5 to 3.5 parts by weight per 100 parts by weight of the composition.

7. An elongated transmission member comprising a plurality of individually insulated conductors having a jacket formed thereover, substantially all the interstices formed among the conductors and between ones of the conductors and the jacket being filled substantially with a flame-retardant, water-resistant composition which includes 4.0 to 10.0 percent by weight of a polyvinyl chloride homopolymer material; 0.5 to 1.5 percent by weight of a chlorinated polyethylene, and 81.0 to 94.0 percent by weight of a chlorinated paraffin.

8. The elongated transmission member of claim 7 wherein the composition also includes 1.0 to 4.0 percent by weight of an epoxy stabilizer and 0.5 to 3.5 percent by weight of a phosphite stabilizer.

9. A method of making an elongated transmission member comprising a plurality of conductors with substantially all the interstices between the conductors being filled substantially with a flame-retardant, water-resistant composition, which includes the steps of:

advancing the elongated transmission member; and coating the conductors which comprise the elongated transmission member with a composition which includes a polyvinyl chloride homopolymer, a chlorinated polyethylene, and a chlorinated paraffin wherein the polyvinyl chloride homopolymer, the chlorinated polyethylene and the chlorinated paraffin are present in an amount ranging from at least 85.5 parts by weight per 100 parts by weight of the composition.

* * * * *